Figure 1:
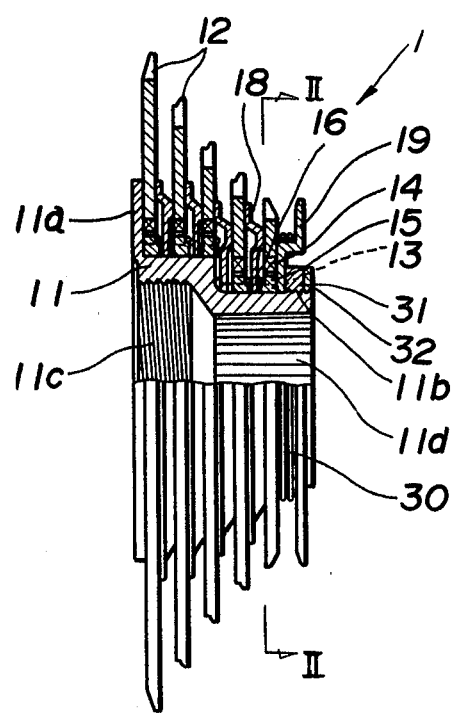

United States Patent [19]

Segawa

[11] 4,089,231

[45] May 16, 1978

[54] MULTISTAGE FREEWHEEL FOR BICYCLES

[75] Inventor: Takashi Segawa, Sakai, Japan

[73] Assignee: Shimano Industrial Company Limited, Osaka, Japan

[21] Appl. No.: 745,181

[22] Filed: Nov. 26, 1976

[30] Foreign Application Priority Data

Dec. 8, 1975 Japan .................................. 50/146774

[51] Int. Cl.² ........................ F16H 11/04; F16D 41/18
[52] U.S. Cl. ...................................... 74/217 B; 192/64
[58] Field of Search ......................... 74/217 B; 192/64

[56] References Cited

U.S. PATENT DOCUMENTS 3,554,340  1/1971  Shimano et al. ........................ 192/64
3,900,088  8/1975  Ozaki .............................. 74/217 B X
3,972,245  8/1976  Allen .............................. 74/217 B X Primary Examiner—Allan D. Herrmann
Attorney, Agent, or Firm—Stevens, Davis, Miller & Mosher

[57] ABSTRACT

A multistage freewheel for a bicycle, comprising a plurality of at least two or more sprockets which are rotatably and axially movably supported to a cylindrical support, each of which sprockets is individually applied with rotary resistance. When a driving chain is shifted by a derailleur the rotary resistance is increased following the chain's shifting motion and the rotary resistance is less at the single sprocket, thereby securing safety in the bicycle operation.

13 Claims, 8 Drawing Figures

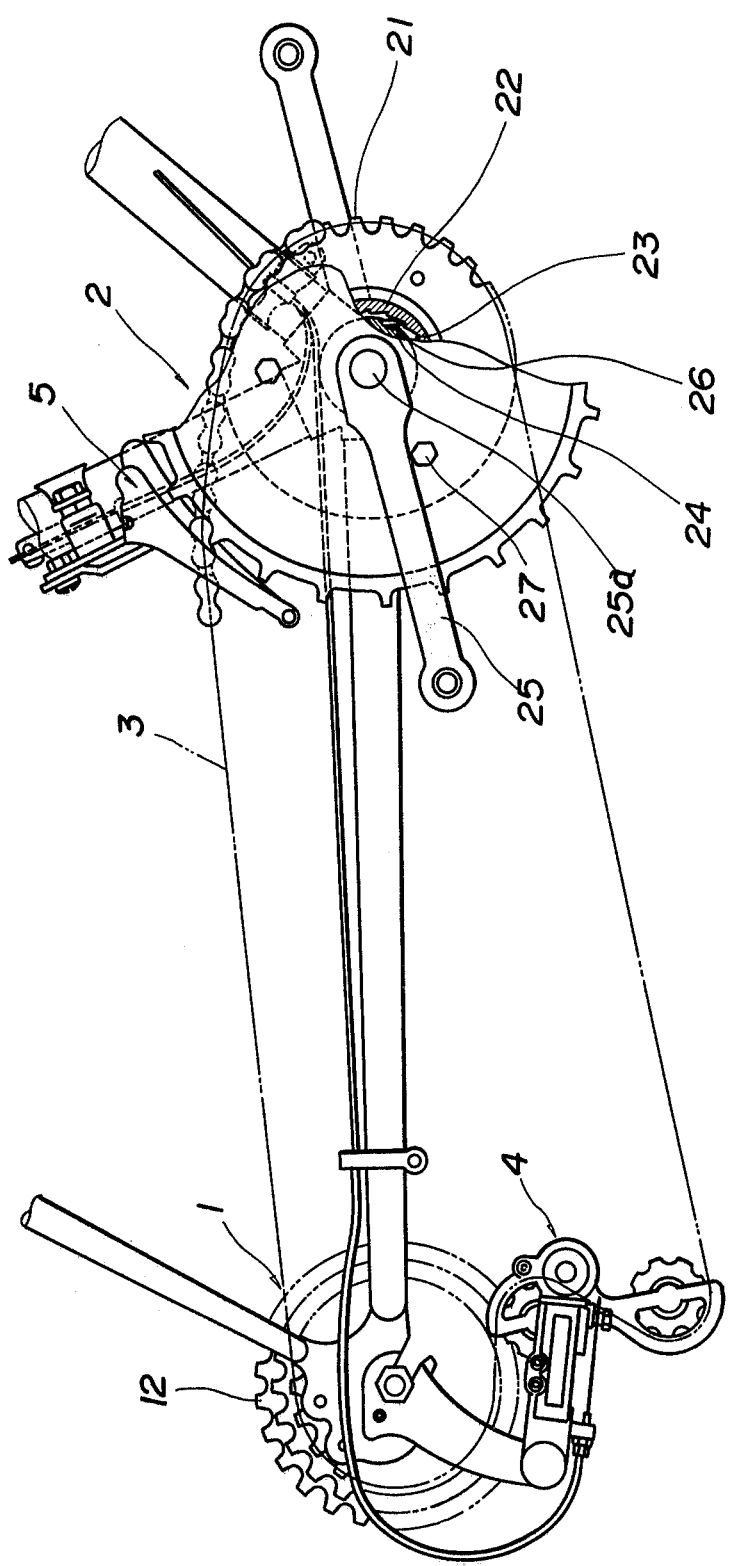

MULTISTAGE FREEWHEEL FOR BICYCLES

This invention relates to a multistage freewheel attached to a rear hub of a bicycle and more particularly to a multistage freewheel which is adapted to be rotatable to allow a driving chain to travel while the bicycle wheels are rotating even without cranking during the bicycle's running, and be in free-rotation when the driving chain is restricted from travelling for one cause or another.

Generally, the multistage freewheel, which is attached to the rear hub for changing the bicycle speed through a derailleur, should be operated through the chain's travelling.

A conventional driving mechanism for the bicycle, however, is so defined that a front sprocket (hereinafter called a front gear) cooperating with the freewheel is fixed to a crank so as to be rotatable therewith. Since the chain travels whenever the crank rotates, it is impossible to change the bicycle speed while the bicycle is running in a non cranking, for example, descending path.

In view of the above problem, a driving mechanism for the bicycle has hitherto been suggested such that the front gear is unidirectionally rotatably pivoted to a crank shaft through a unidirectional transmission. This transmission is applied to pawls thereof with a smaller biasing force of a spring than that applied to pawls of a unidirectional transmission of the multistage freewheel at the rear hub, so that the freewheel may be rotatable together with the rear wheel to lead to the front gear rotation resulting in the travelling of the chain during the wheels rotations even when pedalling is stopped.

In other words, the multistage freewheel is subject to rotary resistance greater than that applied to the front gear in its free-rotation and the driving force is transmitted from the wheel to sprockets of the freewheel through the rear hub in the bicycle's running, whereby the sprockets are made rotatable together with the hub.

In this instance, a greater rotary resistance applied to the sprockets of the freewheel allows the sprockets to be rotatable together with the rear hub in the absence of the free-rotation of sprockets even though the driving chain is subject to some resistance exerted against its travelling, so that the chain may be kept travelling. Hence, there is no worsening of speed-changing efficiency by stopping chain travel caused by the resistance applied thereto against changing the bicycle speed. However, the greater rotary resistance of the sprocket forces the chain to continue to travel even when a cyclist catches his finger or his pants between the front gear and the chain, which is undesirable from a safety standpoint.

When shifting through the derailleur to one sprocket of the multistage freewheel at the rear hub, the chain is guided by a chain guide cage of the derailleur to a selective sprocket. The chain proceeds obliquely to be shifted from the one sprocket to another to result in contact of the oblique chain with the sprocket and guide cage, whereby the resistance of the chain against changing the bicycle speed (hereinafter called the speed-change resistance) is imparted to the sprocket.

The more the driving chain contacts the sprocket and chain guide cage, the greater the speed change becomes so as to reach the maximum when the chain is shifted at one operation from the high speed sprocket to the low speed sprocket. For example, in a five stage freewheel provided with five sprockets, if the speed-change resistance of the average value, for example 2 kg, including the contact resistance of the chain against the guide cage, is applied to the freewheel at the speed-reduction, the value of the resistance amounts to 10 kg when the chain is shifted at one operation from the high speed sprocket to the low speed sprocket. Hence, the driving system cable of changing the speed during the bicycle's running even when the crank is stopped (which is hereinafter called the free-shifter-system), can always be operable under any speed-change condition by setting the value of rotary resistance against free rotation of the freewheel to be over 10 kg.

Thus, the sprockets secured to the rear hub when imparted with rotary resistance valued at more than 10 kg, to an extreme will improve speed-change efficiency. Also the sprockets will, unless the strength over 10 kg affects the chain, continue to rotate in cooperation with the rear hub so as to keep the chain travelling. This results in a lack of safety in operation.

In addition, it is important for the free-shifter-system to be superior in safety of operation as well as improved efficiency for changing the bicycle speed.

The invention has been designed to simultaneously satisfy two contrary requirements: safety in operation and efficiency in changing speed. It is therefore an object of the invention to provide the multistage freewheel fully safe in operation as well as assured changeability of bicycle speed under any condition.

The invention provides a multistage freewheel having two or more sprockets independently rotatable and axially movable in a given range which are supported on a cylindrical support. Between each of the sprockets and the support supporting the sprockets are provided unidirectionally rotary transmissions respectively so that each of the sprockets may be independently rotatable. Also each of the sprockets is applied with predetermined rotary resistance so that the driving chain, when shifted by the derailleur, is moved axially of the sprockets to allow the sprockets to be moved in the same direction as the chain motion, thereby increasing the rotary resistance applied to the sprockets.

Accordingly, the invention allows the sprockets to be in free rotation when the bicycle is normally running, and obtain rotary resistance corresponding to the speed-change resistance increasable in response to the speed-change stages when the bicycle speed is changed. Especially when the speed change is reduced the speed-change performance may be improved, while, when the bicycle is running normally after the speed-change is finished the sprockets are rotatable with greater rotary resistance separately applied thereto, thereby fully ensuring safety in operation.

Figure 2:
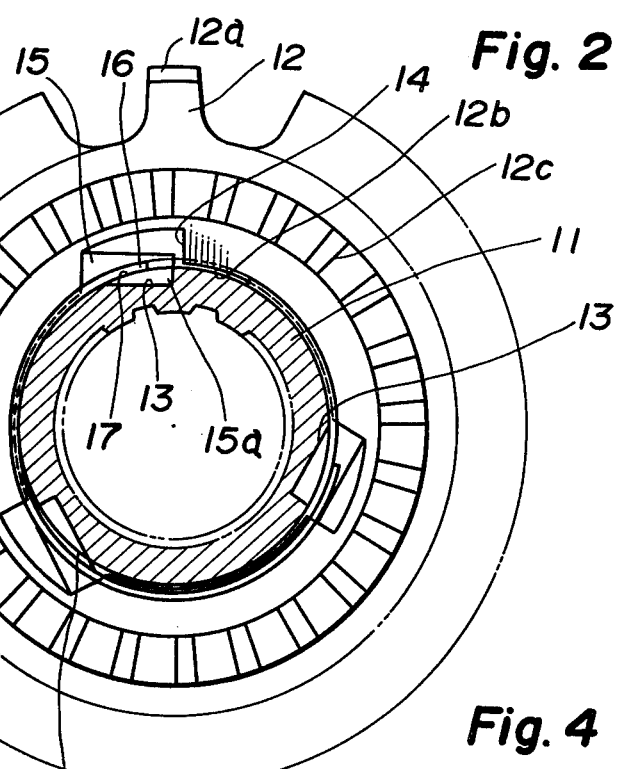
Figure 3:
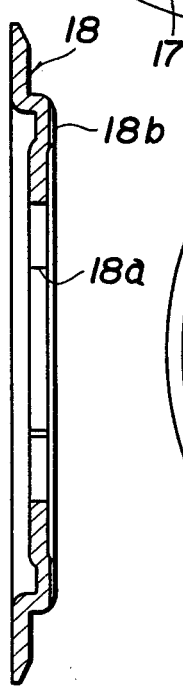
Figure 4:
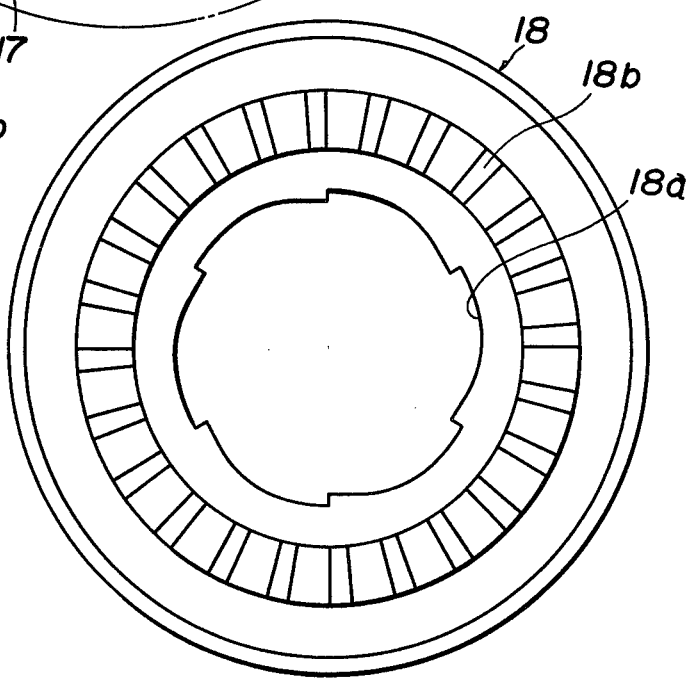
Figure 5:
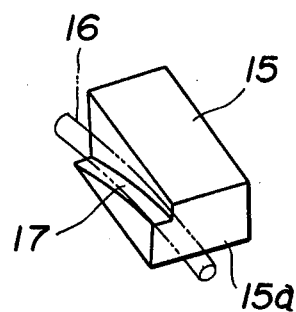
Figure 6:
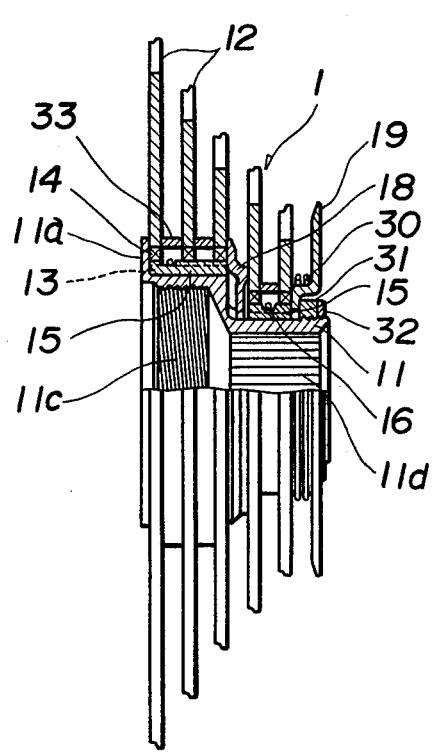
Figure 7:
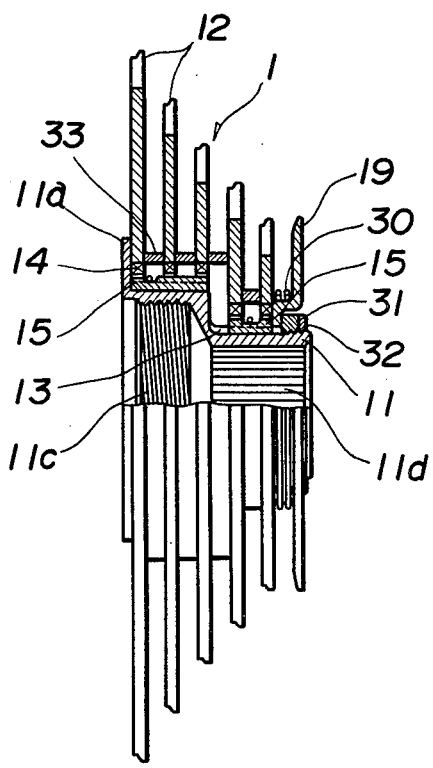

The aforesaid objects and others will be apparent from the following description of an exemplified construction in accordance with the accompanying drawings, in which FIG. 1 is a half longitudinally sectional front view of an embodiment of the invention, FIG. 2 is an enlarged section taken on Line II—II in FIG. 1, FIG. 3 is a longitudinal section of a spacer only of FIG. 2, FIG. 4 is a front view thereof, FIG. 5 is an enlarged perspective view of a pawl, FIGS. 6 and 7 are half longitudinal section showing a modified embodiment of the invention, and FIG. 8 is an illustration of an exemplified application of the invention to the bicycle.

Referring to FIGS. 1 and 2, the freewheel 1 is composed of a cylindrical support 11 screwable to a rear wheel hub (not shown). The support comprises a larger diameter portion and a smaller diameter portion, the larger diameter portion having at the outer periphery of its axially one end a flange 11a extending radially outwardly therefrom and the smaller diameter portion being provided at the outer periphery of its axially one end with a screw thread 11b. At the inner periphery of the larger diameter portion there is provided a screw thread 11c screwable to the hub and at inner periphery of the smaller diameter portion there is provided spline 11d for supporting the support 11 in mesh therewith. At the outer periphery between the flange 11a and the thread 11b of the support 11 there are supported five sprockets 12 of different diameters which are rotatable and axially movable. Between each of the sprockets 12 and the support 11 there are respectively provided unidirectionally rotary transmission to be hereinafter described, so that every sprocket may be freely rotatable.

The sprocket 12, as shown in FIG. 2, is numerously toothed at 12a at the outer periphery thereof, and round bored at 12b, at the center, the teeth 12a differing in number with every sprocket. Among the five sprockets 12, three sprockets have a larger number of teeth and are positioned on the low speed side, i.e., are carried by the larger diameter portion of the support 11 while two sprockets have a smaller number of teeth and are positioned on the high speed side, i.e., are carried by the smaller diameter portion. The round bore 12b of each of the three sprockets 12 on the low speed side is formed to have an inner diameter somewhat larger than the outer diameter of the greater diameter portion of support 11 and that 12b of each of the two sprockets on the high speed side has a somewhat larger inner diameter than the outer diameter of the smaller diameter portion of support 11.

Although support 11 is described as being provided with larger and smaller diameter portions, it may be formed as cylinder of uniform diameter.

The unidirectional rotary transmissions provided between the sprockets 12 and the support 11, comprise, as shown in FIG. 2, a plurality of engaging grooves 13 axially extending and circumferentially disposed at the outer periphery of the support 11 respectively, a plurality of substantially rectangular cutouts 14 disposed circumferentially at the inner periphery of the central bores 12b of the sprockets 12 respectively, pawls 15 insertably mounted in the cutouts 14 respectively, and ring springs 16 for urging the pawls 15 at the tips thereof toward the support 11 side respectively.

Each of the pawls 15 is blocked shaped as shown in FIG. 5, and is recessed at 17 at one side of the pawl in such a manner that the bottom of the recess is arctuately ascending from the rear end thereof to the front end in the forward direction of the sprocket rotation in normal operation so that the ring springs 16 may be insertably engaged with the recesses 17 respectively. The ring springs 16 function to always bias the end corner 15a of each of the pawls against the outer periphery of the support 11 thereby forcing the pawls 15 to mesh with the engaging grooves respectively.

Pawls 15, which are provided for each of the sprockets 12, are provided at the larger diameter and smaller diameter portions.

The pawls 15 as shown are inserted in the cutouts 14 and the engaging groove 13 which are provided at the outer periphery of the support 11, but this arrangement may be reversed, that is, the pawls 15 are supported on the support 11 and the engaging grooves are cut from the central bores 12b of the sprockets 12.

In the aforesaid construction, when one of the sprockets is rotated, this rotation causes support 11 to rotate in cooperation with the one sprocket 12 through the engagement of the pawls with the engaging grooves 13 respectively. On the other hand, when the support 11 is rotated by the wheel rotation during the running of the bicycle, the pawls 15 are disengaged from the grooves so that support 11 only rotates and the rotation of the support 11 is not transmitted to the sprockets 12 i.e., sprockets 12 are in free rotation of the support 11. Each of such sprockets 12 is, as described hereinafter, applied with the predetermined rotary resistance by which the sprockets 11 are made rotatable in cooperation with the support 11.

The rotary resistance, through which the sprocket 12 is allowed to rotate in cooperation with the support 11 which is rotatable together with the rear hub in the forward running of the bicycle, enables the sprocket 12 to rotate by the cooperative rotation with the support 11 as long as the bicycle moves forwards even though not pedalled, thereby shifting the driving chain to mesh with a selected sprocket.

The arrangement of sprockets 12 on support 11 is such that the sprocket 12 larger in diameter and in number of teeth at the lower speed side is abutted against one side of the flange 11a at the outer pheriphery of the end of support 11. Spacers 18 cooperative with the support 11 are inserted between each of the sprockets. Other sprockets are sequentially fitted to the support 11 respectively. On the outside of a sprocket 12 having less teeth and of smaller diameter at the high speed side is fitted a chain guard 19 which is larger in diameter than the smaller diameter sprocket 12. Between the smaller diameter sprocket 12 and the chain guard 19 is inserted an elastic member, i.e., a compression coiled spring 30 of axially exerting resiliency. Chain guard 19 is fixed to the support 11 through the thread 11b and a nut 31 screwable thereon and is locked by a lock nut 32. To be noted, the chain guard 19 is so located that the sprockets 12 and spacers 18 may be shiftable axially of the support 11 in a given range, preferably of 0.5 mm or less, at the tooth top of each of the sprockets respectively. The compression spring 30 serves to bias each of the sprockets 12 from the high speed side one to another sequently through the spacers 18, thereby applying the predetermined rotary resistance to each of the sprockets 12.

Furthermore, it is important that the rotary resistance mounts up by the chain moving axially of the sprockets when shifted by a rear derailleur as is hereinafter described.

In greater detail, in the case that the multistage freewheel is mounted to the bicycle rear wheel hub so as to cooperate with the rear derailleur 4, the driving chain 3, which is axially moved by means of the rear derailleur 4, comes into contact with the sprocket 12 to allow the sprocket 12 to axially move together with the chain 3 by the kinetic energy thereof. As a result, the sprocket 12 is pressed against the spacer 18 cooperative with the support 11 to cause the frictional resistance between the sprocket 12 and the lateral side of spacer 18, thereby increasing the rotary resistance applied to the sprocket 12.

The spacer 18, as shown in FIGS. 3 and 4, is formed in a hollow disc-like shape and provided at its inner periphery with ratchet teeth 18a engageable with the engaging grooves 13, and arranged in the relation of being only axially movable with respect to the support 11 but not relative rotatable thereto. Also, the spacer 18 has at one of its sides serrations 18b circumferentially formed in a ratchet-teeth-like shape and the sprocket 12 also has at one of its sides opposite to the one side of the spacer the same serrations 12c, as shown in FIG. 2. The serrations 18b and 12c are in mesh with each other in the axially movement of the sprocket 12 by the force axially applied thereto so that the sprocket 12 may be made less slippery with respect to the spacer 18 resulting in the sprocket 12 being ensured to be exactly applied with the predetermined rotary resistance. The serrations 18b and 12a, which serve to make the slip as little as possible when the resistance is increased, may be substituted by roughened faces with numerous projections at both of the opposite sides.

The aforesaid embodiment of the invention has the sprockets 12 each carried by the support 11 and the spacers 18 inserted between the sprockets 12. Besides this, the sprockets 12 as shown in FIG. 6, may be divided into two groups of three sprockets 12 having a larger number of teeth at the low speed side and two sprockets 12 having a smaller number of teeth at the high speed side, each group of which is provided with one pawl 15 which is combined with the engaging grooves 13 at the support 11 to build up the unidirectionally rotary transmissions respectively, and which groups have one of the spacers 18 inserted therebetween.

The divided groups of the sprockets in FIG. 6 may be connected at the center thereof with a cylinder (not shown), where the unidirectional transmission is inserted between the inner periphery of the cylinder and the outer periphery of the support 11.

The five sprockets in FIG. 6 divided into two groups of high and low speed stages, may be divided into groups of two sprockets lash and a single sprocket inserted, for example, between the groups, where a first unidirectionally rotary transmission is provided with every group and a second transmission with every single sprocket.

The aforesaid spacers 18 non-rotatable relative to the support 11 are not absolutely necessary but they, as shown in FIG. 7, may be substitute for rotatable ring-like shaped spacers 33.

The rotary resistance of the freewheel constructed as aforesaid, which is produced from the resiliency of compression spring 30, is desirably adjustable to the extent of the tightening force of the nut 31, and is defined in the given value so that when the chain is subject to a force against travelling exceeding the rotary resistance, the sprockets 12 are released from the cooperative rotation with the support 11 to be in free-rotation, resulting in rotation of the support 11 only.

The rotary resistance value is made smaller than the external force exerted on the sprockets 12, such as the force cause by catching a cyclist's fingers between the sprockets and chain or a front gear and chain, thereby ensuring safety in operation. The value is, for example, made equal to that resulting from dividing the maximum speed-change resistance value by the number of sprockets 12, thereby fully ensuring safety in operation.

Now, the freewheel 1 constructed as aforesaid, which is available together with the front gear 2 freely rotatable as shown in FIG. 8, to be the so-called free-shifter-system drive, will be described hereinafter.

The front gear 2 in FIG. 8 comprises two sprockets 21. The sprockets 21 have at the center thereof bosses 22 respectively, each of which has a central bore provided at its inner periphery with ratchet teeth 23, a cone 24 integrated with a crank 25 has at its outer periphery pawls 16 in mesh with the ratchet teeth 23. The sprockets 21 and the crank shaft 25a are rotatably connected through bearings, so that the sprockets 21 building up the front gear 2 may be rotatable relative to the crank 25 in only one direction through a unidirectionally rotary transmission comprising the ratchet teeth 23 and pawls 26, screws for connecting the sprockets being represented by the numeral 27 and a front derailleur by 5.

Referring to FIG. 8, when the crank shaft is rotated by pedalling, the front gear 2 is normally rotated through the engagement of the pawls 26 with the ratchet teeth 23, and eventually the driving chain 3 travels to allow the sprockets 12 at the rear wheel to be rotated, so that the rear wheel may be rotatable through the pawls 15 inserted into the cutouts 14 and engaging grooves 13 in mesh therewith, thereby running the bicycle.

Since the chain 3 is travelling while pedalling, the rear or front derailleur 4 or 5 is controlled to shift the chain to a selective one of the different diameter sprockets 12 or 21, thereby changing the bicycle speed.

While the bicycle is running without pedalling on a slope or the like, that is, when the crank 25 is in a stop, the support 11 rotating together with the rear hub allows the sprockets 12 to be rotatable in cooperation with the support 11 through the aforesaid rotary resistance. Hence, it is different from a conventional bicycle in that the chain's travel follows the rear wheel rotation. At this time, the chain's travel also causes the front gear to be rotated, however, the front gear is idling by the disengagement of the pawls 26 from the ratchet teeth 23 and the crank shaft 25a is isolated from the gear rotation, whereby the operation, for example, of the rear derailleur 4 by the control lever, makes it possible to shift the chain 3 to one of the selected sprockets.

In a case that the chain is shifted in one action from the high speed sprocket to the low speed sprocket, the maximum rotary resistance is applied to the chain 3, when the chain 3 is moved axially of the sprockets so as to axially urge the sprockets 12 to be frictionally contacted with the spacer 18. As a result, the spacer 18, which is rotatable in cooperation with the support 11, applies to the sprockets 12 the rotary resistance increased by the contact of the sprocket 12 with the spacer 18, which resistance exceeds the speed-change resistance. Hence, the sprockets may be made rotatable together with the support 11 in the absence of free rotation with respect thereto, thereby ensuring the chain's shifting.

In addition, the driving chain travels without any hindrance after the speed-change is over one under no greater rotary resistance than from one sprocket in mesh with the chain.

If the chain 3 is caught between the front gear 2 and the bicycle frame to be restricted from travelling, or the cyclist's fingers are caught between the front gear 2 and the chain 3, in the bicycle running, the cooperative rotation of the sprockets 12 with the support 11 is immediately eliminated to result in only the support 11 rotating.

Hence, the stopping of chain 3's travelling leads to no sudden braking to the rear wheel, and when the cyclist's fingers are caught between the chain and front gear the chain stops its travel at once to prevent the fingers from being further bitten, so that the bicycle may be prevented from an accident by suddenly stopping as well as insured of safety in running.

The aforesaid embodiment has the support 11 mounted to the rear wheel hub, but which support 11 may be integral with the hub, or it may be used as an inner member and an outer member separately formed to carry the sprockets 12 as aforesaid, in As clearly understood from the abovementioned description, the freewheel of the invention is adapted to make the sprockets movable axially of the support by the derailleur in a given range only so that the chain axially moved by the derailleur may allow the sprockets to be axially moved, thereby increasing the rotary resistane of the sprockets to free rotation. Hence, the freewheel of the invention is advantageous in that in the normal running of the bicycle the rotary resistance of the sprockets can be made small in free rotation to thereby improve the safety in operation, on the other hand, in speed changing the rotary resistance is made over the speed-change resistance so that the bicycle is fully securable of the speed-changing efficiency.

While the form of embodiment of the invention as herein described constitutes a preferred form, it is to be understood that other forms might be adopted, all coming within the scope of the claims which follow.

What is claimed is:

1. A multistage freewheel for changing the speed of a bicycle by shifting a driving chain through a derailleur, comprising
    (a) at least two sprockets, said sprockets having at the outer periphery thereof numerous teeth with each sprocket having a different number and at the center round bores,
    (b) a cylindrical support, said support having an outer diameter smaller than an inner diameter of said bore of each of said sprockets and supporting each of said sprockets individually in a rotatable and axially movable relation,
    (c) at least two unidirectional rotary transmissions provided between the inner periphery of said round bores of the sprockets and the outer periphery of said support, said rotary transmissions allowing said sprockets to be free-rotatable independent of one another, and
    (d) means for applying rotary resistance to said free rotation of said sprockets, said means comprising an elastic member elastically shiftable axially of said support and axially unidirectionally biasing said sprockets, whereby the chain, when shifted by the derailleur, is moved axially of said sprockets to make said sprockets movable in the same direction as the chain motion resulting in increasing the rotary resistance.

2. The multistage freewheel according to claim 1, wherein each of said unidirectional rotary transmissions comprises pawls and engaging grooves engageable therewith, said pawls being insertably mounted to cutouts formed on each of said sprockets, said engaging grooves being provided at the outer periphery of said support and extending axially thereof.

3. The multistage freewheel according to claim 2, wherein said pawls are provided on said support and said engaging grooves are provided on said round bore of each of said sprockets.

4. The multistage freewheel according to claim 1, wherein at axially one end of said support is formed a flange radially outwardly extending and axially at the outer periphery of the other end is provided a screw thread, said flange being abutted against one of said sprockets, which has a larger number of teeth and a larger diameter, said screw thread being meshed with a nut, and between said nut and another sprocket of a smaller number of teeth and smaller diameter is insertably mounted an axially biasing spring means.

5. The multistage freewheel according to claim 4, wherein between said nut and said sprocket of a smaller number of teeth and smaller diameter is inserted a chain guard having a larger diameter than the outer diameter of said sprocket and between said chain guard and said sprocket is inserted an axially biasing spring means.

6. The multistage freewheel according to claim 4, wherein said nut is screwed on said thread of the support in a forward or backward screwable relation therewith so that saidspring means may adjust the rotary resistance applied to said sprockets.

7. The multistage freewheel according to claim 1, wherein spacers are inserted between each of said sprockets, said spacers being only axially movably supported with respect to said support so that the motion of said chain moving axially of said sprockets, when the chain is shifted by the derailleur, may be conveyed through each of the spacers to the sprocket adjacently abutting thereagainst.

8. The multistage freewheel according to claim 7, wherein said spacers are provided with portions in contact with the sprockets, said portions having numerous serrations thereon, thereby preventing the sprockets from slipping relative to said spacers.

9. A multistage freewheel for changing the speed of a bicycle by shifting a driving chain through a derailleur, comprising:
    (a) at least one set of sprocket groups of at least two sprockets each and at least a single sprocket, said sprockets of said groups and said single sprocket having circumferentially mounted numerous teeth different in number from every other sprocket,
    (b) a cylindrical support, said support supporting said sprocket groups and said single sprocket individually in a rotatable and axially movable relation,
    (c) a set of first unidirectionally rotary transmissions provided between said sprocket groups and said support, said rotary transmissions allowing said sprocket groups to be in free-rotation independently with respect to said single sprocket,
    (d) at least one set of second unidirectionally rotary transmissions provided between said single sprocket and said support, said rotary transmissions allowing said single sprocket to be in free-rotation independently with respect to said sprocket groups, and
    (e) means for applying rotary resistance to said free rotation of said sprocket groups and said single sprocket, said means comprising an elastic means electically shiftable axially of each support and axially unidirectionally biasing said sprocket groups and said single sprocket, whereby said chain, when shifted by the derailleur, is moved axially of said sprockets so as to force said sprockets to be moved in the same direction as the chain motion resulting in increasing the rotary resistance.

10. The multistage freewheel according to claim 9, wherein the sprockets building up said sprocket groups are mutually connected with cylindrical members of inner diameters larger than the outer diameter of said support and said first unidirectionally rotary transmissions are provided between the inner peripheries of said cylindrical members and the outer periphery of said support.

11. The multistage freewheel according to claim 9, wherein said first unidirectionally rotary transmissions comprise ratchet teeth and pawls in mesh therewith, said ratchet teeth being provided on one of the outer periphery of said support and the inner periphery of each of said cylindrical members, said pawls being provided at the other.

12. A multistage freewheel for changing the speed of a bicycle by shifting a driving chain by a derailleur, comprising:
 (a) at least two sets of a first and a second sprocket group of at least two sprockets respectively, each of said sprockets of said groups having at its outer periphery numerous teeth, said teeth being different in number for each sprocket,
 (b) a cylindrical support, said support individually rotatably and axially movably supporting each of said sprocket groups,
 (c) unidirectionally rotary transmissions provided between each of said sprocket groups and said support, each transmission making each of said sprocket groups freely rotatable independently with respect to another group, and
 (d) means for applying rotary resistance to free rotation of each of said sprocket groups, said means comprising an elastic member elastically functionable axially of said support so as to urge said sprockets axially unidirectionally, whereby the chain, when shifted by the derailleur, is moved axially of said sprocket to force said sprockets in the same direction as the chain motion to result in increasing the rotary resistance.

13. The multistage freewheel according to claim 12, wherein said first and second sprocket groups are combined with said single sprocket.

* * * * *